US012799550B2

(12) United States Patent
Nakahara et al.

(10) Patent No.: US 12,799,550 B2
(45) Date of Patent: Nov. 17, 2026

(54) METHOD OF REDUCING IRON ORE POWDER

(71) Applicant: JFE STEEL CORPORATION, Tokyo (JP)

(72) Inventors: Yoshiko Nakahara, Tokyo (JP); Koki Terui, Tokyo (JP); Sumito Ozawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 310 days.

(21) Appl. No.: 18/836,352

(22) PCT Filed: Dec. 1, 2022

(86) PCT No.: PCT/JP2022/044473
§ 371 (c)(1),
(2) Date: Aug. 7, 2024

(87) PCT Pub. No.: WO2023/162389
PCT Pub. Date: Aug. 31, 2023

(65) Prior Publication Data

US 2025/0163525 A1 May 22, 2025

(30) Foreign Application Priority Data

Feb. 24, 2022 (JP) ................................ 2022-027271

(51) Int. Cl.
*C21B 13/00* (2006.01)
*F27D 17/20* (2025.01)

(52) U.S. Cl.
CPC ........ *C21B 13/0033* (2013.01); *C21B 13/004* (2013.01); *C21B 13/0073* (2013.01);
(Continued)

(58) Field of Classification Search
None
See application file for complete search history.

(56) References Cited

U.S. PATENT DOCUMENTS 4,936,908 A * 6/1990 Takahashi ............... C21B 13/14 75/502
2008/0302212 A1 12/2008 Jeong et al.

FOREIGN PATENT DOCUMENTS

EP 2543743 A1 1/2013
JP S5832689 A 2/1983
(Continued)

OTHER PUBLICATIONS

English language machine translation of KR-20050054849-A. Generated Aug. 25, 2026. (Year: 2026).*
(Continued)

*Primary Examiner* — Brian D Walck
(74) *Attorney, Agent, or Firm* — KENJA IP LAW PC

(57) ABSTRACT

In a process of reducing iron ore powder by fluidized bed reduction furnaces and a smelting reduction furnace, $CO_2$ emissions are significantly reduced and stable operation is possible regardless of fluctuations in various conditions. A method of reducing iron ore powder, the method including: a fluidized bed reduction process of fluidizing and reducing iron ore powder in a fluidized bed reduction furnace using a first reducing gas to produce partially reduced iron; and a smelting reduction process of reducing the partially reduced iron in a smelting reduction furnace using a second reducing gas. Fluidized bed reduction furnace top gas discharged from the top of the fluidized bed reduction furnace is used for synthesis of methane and reforming of methane-containing gas.

19 Claims, 2 Drawing Sheets

(52) U.S. Cl.
CPC .......... *F27D 17/20* (2025.01); *C21B 2100/22* (2017.05); *C21B 2100/28* (2017.05); *C21B 2100/80* (2017.05)

(56) References Cited

FOREIGN PATENT DOCUMENTS

| | | | | | |
|---|---|---|---|---|---|
| JP | S58174512 | A | | 10/1983 | |
| JP | S60100635 | A | | 6/1985 | |
| JP | S6156216 | A | | 3/1986 | |
| JP | S6220806 | A | | 1/1987 | |
| JP | H01149911 | A | | 6/1989 | |
| JP | H04314808 | A | | 11/1992 | |
| JP | H10287908 | A | | 10/1998 | |
| JP | 2009521605 | A | | 6/2009 | |
| JP | 2011225969 | A | | 11/2011 | |
| KR | 20050054849 | A | * | 6/2005 | ........... C21B 13/143 |
| KR | 1020050054849 | A | | 6/2005 | |
| KR | 1020120105562 | A | | 9/2012 | |
| WO | WO-9723655 | A1 | * | 7/1997 | ............. C21B 13/00 |

OTHER PUBLICATIONS

Mar. 9, 2026, Office Action issued by the Ministry of Intellectual Property in the corresponding Korean Patent Application No. 10-2024-7021744 with English language concise statement of relevance.
Feb. 14, 2023, International Search Report issued in the International Patent Application No. PCT/JP2022/044473.
Jul. 10, 2025, Office Action issued by the IP Australia in the corresponding Australian Patent Application No. 2022442457.

* cited by examiner

METHOD OF REDUCING IRON ORE POWDER

TECHNICAL FIELD

The present disclosure relates to a method of reducing iron ore powder.

BACKGROUND

In recent years, there has been a strong demand for energy conservation in steelworks against the backdrop of global environmental issues and fossil fuel depletion issues.

The raw material of iron is mainly iron oxide, and the reduction process to reduce iron oxide is essential to produce iron. The most widespread and common reduction process worldwide is a blast furnace method. In a blast furnace, coke or pulverized coal reacts with oxygen in hot blast (air heated to about 1200 °C) in a tuyere to produce CO and $H_2$ gases (reducing gases), which are used to reduce iron ore and the like in the furnace. Recent improvements in blast furnace operation technology have reduced the reducing agent rate (amount of reducing agent (coke, pulverized coal) used per 1 t of hot metal) to about 500 kg/t. However, the reducing agent rate has already almost reached a lower limit, and no further significant decrease in the reducing agent rate is expected.

A process using a vertical reduction furnace is also commonly used in regions where natural gas is produced. In the process, a vertical reduction furnace is charged with sintered ore, pellets, or other lumped iron ore as iron oxide raw material, and reducing gas containing hydrogen and carbon monoxide is blown in to reduce the iron oxide raw material to produce reduced iron. As the reduction furnace, shaft furnaces are mainly used. Further, the reducing gas is produced using natural gas and the like as raw material gas. That is, the raw material gas is heated in a heating reformer together with top gas discharged from the top of the shaft furnace, and reformed to produce reducing gas. The reducing gas produced is blown into the shaft furnace and reacts with iron oxide raw material supplied from the top of the shaft furnace. As a result, iron oxide is reduced to reduced iron. The reduced iron produced is cooled in a region below a position in the shaft furnace where the reducing gas is blown in, and then discharged from the bottom of the shaft furnace.

However, the process using the shaft furnace as described above has the following limitations. First, in the process, iron ore needs to be pelletized into lumped ore or pellets in advance, which results in high raw material costs. Further, the process limits the usable raw material to relatively high-grade iron ore.

Therefore, a fluidized bed reduction process using a fluidized bed reduction furnace has been developed as a process that is not subject to the above restrictions. In the fluidized bed reduction process, reducing gas is blown in from the bottom of the fluidized bed reduction furnace to reduce the iron ore powder in a suspended flow. In the fluidized bed reduction process, iron ore powder can be used without pelletizing. Further, the fluidized bed reduction process has fewer restrictions on raw materials and can use relatively low-grade iron ore.

As a method of reducing iron ore powder using a fluidized bed reduction furnace, for example, Patent Literature (PTL) 1 describes a method of producing reduced iron from iron ore powder through a preliminary reduction process in a first fluidized bed and a final reduction process in a second fluidized bed. As another example, PTL 2 describes a method in which ore is subject to fluidized bed reduction in a preliminary reduction furnace then final reduction in a smelting reduction furnace. Further, PTL 3 describes a method of producing hot metal by reducing iron ore powder to reduced iron by one or more fluidized bed reduction furnaces, then charging carbon material and the reduced iron into a melter-gasifier, and further blowing in oxygen.

PATENT LITERATURE

PTL 1: JP H10-287908 A
PTL 2: JP H01-149911 A
PTL 3: JP 2009-521605 A (publication in Japan of WO2007/075023 A1)
PTL 4: JP 2011-225969 A

SUMMARY

Technical Problem

However, the method of reducing iron ore powder described in PTL 1 uses CO gas as a reducing agent, while the method of reducing iron ore powder described in PTL 2 and 3 uses coal or other carbon material as a reducing agent. Accordingly, each method emits a large amount of $CO_2$ from the top of the fluidized bed reduction furnace.

In the field of blast furnace technology, as a technology for reducing $CO_2$ emissions, a technology has been proposed to reform CO and $CO_2$ contained in by-product gas discharged from the blast furnace to produce methane, which is then reintroduced into the blast furnace as a reducing agent (PTL 4).

However, the process proposed in PTL 4 is a technology that assumes direct blowing of methane into a blast furnace and cannot be applied to a process of reducing iron ore powder by a fluidized bed reduction furnace and a smelting reduction furnace.

In view of the current situation described above, it would be helpful to significantly reduce $CO_2$ emissions in a process of reducing iron ore powder by a fluidized bed reduction furnace and a smelting reduction furnace.

Solution to Problem

The present disclosure is based on the discoveries described above, and primary features of the present disclosure are as described below.

1. A method of reducing iron ore powder, the method comprising:

a fluidized bed reduction process of fluidizing and reducing iron ore powder in a fluidized bed reduction furnace using a first reducing gas to produce partially reduced iron; and a smelting reduction process of reducing the partially reduced iron in a smelting reduction furnace using a second reducing gas, wherein fluidized bed reduction furnace top gas discharged from the top of the fluidized bed reduction furnace is divided into a first fluidized bed reduction furnace top gas and a second fluidized bed reduction furnace top gas, methane is synthesized from the first fluidized bed reduction furnace top gas and hydrogen gas to obtain methane-containing gas, the methane-containing gas is reacted with the second fluidized bed reduction furnace top gas to reform methane contained in the methane-containing gas to obtain reformed gas, in the smelting reduction process, the reformed gas is blown into the smelting reduction furnace as the second reducing gas, and in the fluidized bed reduction process, smelting reduction furnace top gas discharged from the top of the smelting reduction furnace is blown into the fluidized bed reduction furnace as the first reducing gas.

2. The method of reducing iron ore powder according to 1, above, wherein an amount $V_1$ of the first fluidized bed reduction furnace top gas supplied to the synthesis of methane and an amount Vw of water vapor in the second fluidized bed reduction furnace top gas supplied to the reforming of methane are adjusted according to variation in a $H_2$/CO ratio in the second reducing gas blown into the smelting reduction furnace.

3. The method of reducing iron ore powder according to 2, above, wherein when the $H_2$/CO ratio increases, the amount Vw of water vapor and the amount $V_1$ of the first fluidized bed reduction furnace top gas are decreased.

4. The method of reducing iron ore powder according to 2 or 3, above, wherein when the $H_2$/CO ratio decreases, the amount Vw of water vapor and the amount $V_1$ of the first fluidized bed reduction furnace top gas are increased.

5. The method of reducing iron ore powder according to any one of 1 to 4, above, wherein the reduction degree in the fluidized bed reduction process is 60% or more and 90% or less.

6. The method of reducing iron ore powder according to 5, above, wherein the reduction degree in the fluidized bed reduction process is 70% or more and 80% or less.

7. The method of reducing iron ore powder according to any one of 1 to 6, above, wherein the fluidized bed reduction furnace top gas is dedusted prior to the division into the first fluidized bed reduction furnace top gas and the second fluidized bed reduction furnace top gas.

8. The method of reducing iron ore powder according to any one of 1 to 7, above, wherein the second fluidized bed reduction furnace top gas is dehydrated prior to the reforming.

9. The method of reducing iron ore powder according to any one of 1 to 8, above, wherein the fluidized bed reduction furnace top gas is dehydrated prior to the division into the first fluidized bed reduction furnace top gas and the second fluidized bed reduction furnace top gas.

10. The method of reducing iron ore powder according to any one of 1 to 9, above, wherein the methane-containing gas is dehydrated prior to the reforming.

11. The method of reducing iron ore powder according to any one of 1 to 10, above, further comprising a briquetting process of briquetting the partially reduced iron prior to the smelting reduction process.

Advantageous Effect

According to the present disclosure, $CO_2$ emissions can be significantly reduced in a process of reducing iron ore powder by a fluidized bed reduction furnace and a smelting reduction furnace.

DETAILED DESCRIPTION

In the method of reducing iron ore powder according to an embodiment of the present disclosure, the iron ore powder is fluidized and reduced to partially reduced iron by a first reducing gas in a fluidized bed reduction furnace (fluidized bed reduction process), and then the partially reduced iron is reduced by a second reducing gas in a smelting reduction furnace (smelting reduction process). The fluidized bed reduction furnace top gas discharged from the top of the fluidized bed reduction furnace is circulated for use.

Specifically, first, the fluidized bed reduction furnace top gas discharged from the top of the fluidized bed reduction furnace is divided into a first fluidized bed reduction furnace top gas and a second fluidized bed reduction furnace top gas. Then, methane is synthesized from the first fluidized bed reduction furnace top gas and hydrogen gas to obtain methane-containing gas. The methane-containing gas is reacted with the second fluidized bed reduction furnace top gas to reform methane contained in the methane-containing gas to obtain reformed gas.

In the smelting reduction process, the reformed gas is blown into the smelting reduction furnace as the second reducing gas, and in the fluidized bed reduction process, smelting reduction furnace top gas discharged from the top of the smelting reduction furnace is blown into the fluidized bed reduction furnace as the first reducing gas.

Thus, by circulating and reusing the fluidized bed reduction furnace top gas, $CO_2$ emissions can be extremely effectively decreased.

The method of the present disclosure is described more specifically below, with reference to the drawings. The following description describes examples of preferred embodiments of the present disclosure, and does not limit the disclosure to the embodiments described below.

Figure 1:
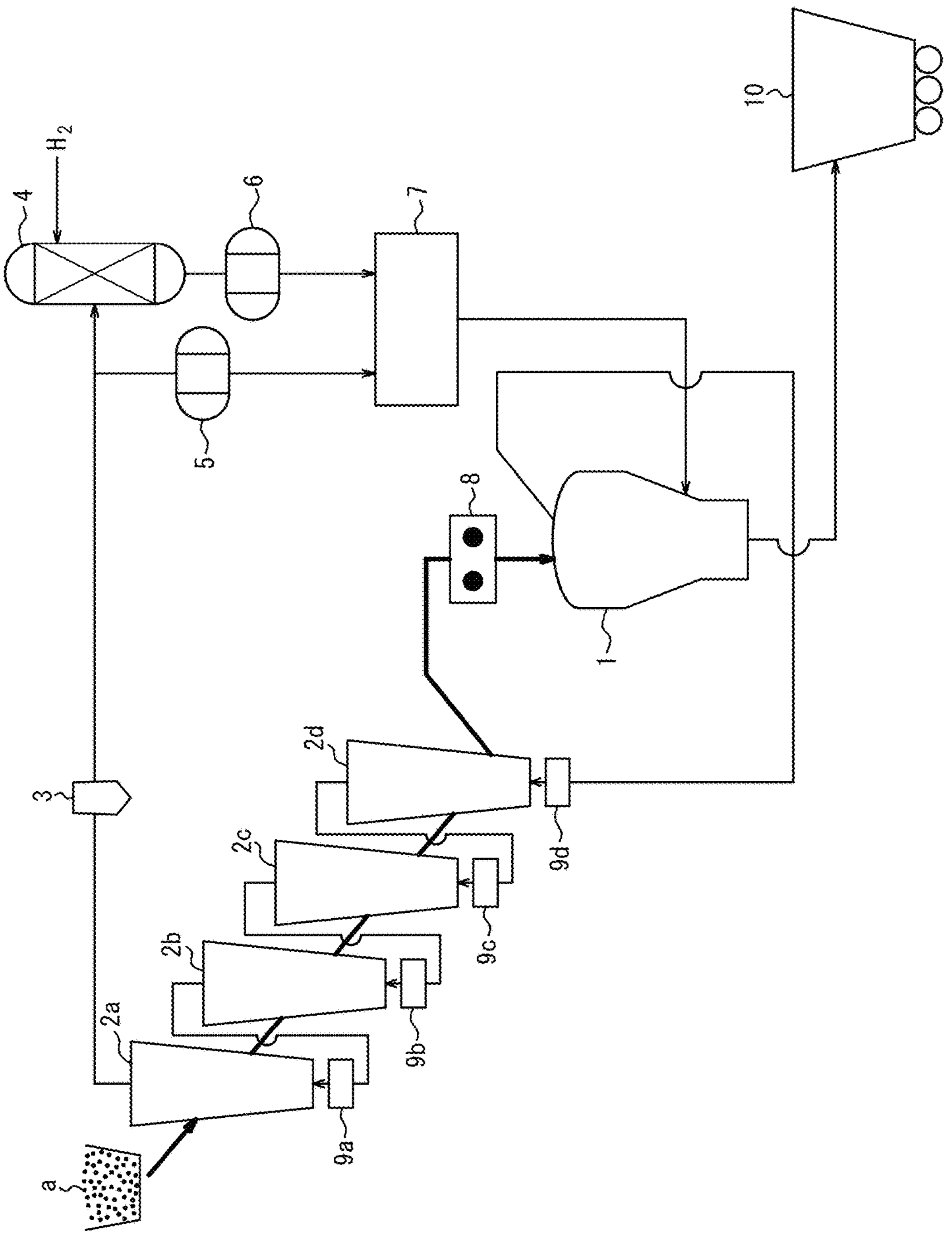
FIG. 1 is a schematic diagram of the method of reducing iron ore powder according to an embodiment of the present disclosure.

In FIG. 1, reference sign 1 is a smelting reduction furnace, 2_a_ to 2_d_ are fluidized bed reduction furnaces, 3 is a dust remover for top gas, 4 is a methane synthesizer (methane converter) that synthesizes methane from a portion of top gas and externally-supplied hydrogen, 5 and 6 are dehydrators, 7 is a gas reformer that heats and reforms methane to synthesize reducing gas containing carbon monoxide gas and hydrogen gas, 8 is a briquetting device, 9_a_ to 9_d_ are gas blowing devices that supply reducing gas to the fluidized bed reduction furnaces 2_a_ to 2_d_, and 10 is an electric furnace.

First, iron ore powder a as raw material is charged into the fluidized bed reduction furnace 2_a_, and the iron ore powder a is fluidized and reduced by blowing in the first reducing gas from the bottom of the fluidized bed reduction furnace 2_a_. The iron ore powder a that is fluidized and reduced in the fluidized bed reduction furnace 2_a_ is then successively introduced into the fluidized bed reduction furnaces 2_b_, 2_c_, and 2_d_ for fluidized bed reduction. The partially reduced iron obtained by fluidized bed reduction in the fluidized bed reduction furnace 2_d_ that is the final stage in the fluidized bed reduction furnaces is then briquetted by the briquetting device 8 and introduced into the smelting reduction furnace 1, where the partially reduced iron is smelted and reduced by the second reducing gas.

According to the present disclosure, the reduction of iron ore powder is carried out through the fluidized bed reduction process using fluidized bed reduction furnaces and subsequently the smelting reduction process as described above. The reduced iron finally obtained is discharged from the smelting reduction furnace 1 and supplied to subsequent processing. In the example illustrated in FIG. 1, the reduced iron is supplied to the electric furnace 10.

The fluidized bed reduction furnace top gas discharged from the top of the fluidized bed furnace consists mainly of CO, $CO_2$, $H_2$, and $H_2O$. Therefore, methane is produced by reacting the fluidized bed reduction furnace top gas with hydrogen.

Specifically, the fluidized bed reduction furnace top gas discharged from the fluidized bed reduction furnace 2*a*, which is disposed upstream in the reduction flow of iron ore powder, is divided into a first fluidized bed reduction furnace top gas and a second fluidized bed reduction furnace top gas, and the first fluidized bed reduction furnace top gas is introduced into the methane synthesizer 4. In the methane synthesizer 4, methane is synthesized from CO and $CO_2$ contained in the first fluidized bed reduction furnace top gas and externally supplied hydrogen by reactions represented in Expressions (i) and (ii) below, to obtain methane-containing gas.

$$CO_2 + 4H_2 \rightarrow CH_4 + 2H_2O \quad \text{(i)}$$

$$CO + 3H_2 \rightarrow CH_4 + H_2O \quad \text{(ii)}$$

The fluidized bed reduction furnace top gas is preferably dedusted prior to the division into the first fluidized bed reduction top gas and the second fluidized bed reduction furnace top gas. Any dust remover may be used as the dust remover 3 for the dedusting.

The second fluidized bed reduction furnace top gas is preferably dehydrated after the division into the first fluidized bed reduction top gas and the second fluidized bed reduction furnace top gas, prior to reforming. Any dehydrator may be used as the dehydrator 5 for the dehydration.

In the example illustrated in FIG. 1, the fluidized bed furnace top gas discharged from the fluidized bed reduction furnace 2*a*, which is the first stage fluidized bed reduction furnace, is first dedusted by the dust remover 3, then divided into the first fluidized bed reduction furnace top gas and the second fluidized bed furnace top gas, then the second fluidized bed furnace top gas is dehydrated.

The methane-containing gas obtained in the methane synthesizer 4 is sent to the gas reformer 7 together with the second fluidized bed reduction furnace top gas. In the gas reformer 7, reformed gas containing carbon monoxide gas and hydrogen gas is synthesized by the reforming reactions represented in Expressions (iii) and (iv) below. By supplying water vapor to the gas reformer, the reforming reaction represented in Expression (iv) proceeds.

$$CH_4 + CO_2 \rightarrow 2CO + 2H_2 \quad \text{(iii)}$$

$$CH_4 + H_2O \rightarrow +3H_2 \quad \text{(iv)}$$

The methane-containing gas is preferably dehydrated prior to the reforming. Any dehydrator may be used as the dehydrator 6 for the dehydration.

The reformed gas is then blown into the smelting reduction furnace 1. That is, the reformed gas is used as the second reducing gas in the smelting reduction process.

Further, the smelting reduction furnace top gas discharged from the top of the smelting reduction furnace 1 is blown into a fluidized bed reduction furnace. That is, in the fluidized bed reduction process, the smelting reduction furnace top gas discharged from the top of the smelting reduction furnace is used as the first reducing gas. For example, in the embodiment illustrated in FIG. 1, four fluidized bed reduction furnaces connected in series are used, and therefore the smelting reduction furnace top gas is first blown in from the bottom of the fluidized bed reduction furnace 2*d*, which is the last stage of the fluidized bed reduction furnaces. The gas discharged from the top of the fluidized bed reduction furnace 2*d* is then blown into the bottom of the fluidized bed reduction furnace 2*c*, the gas discharged from the top of the fluidized bed reduction furnace 2*c* is then blown into the bottom of the fluidized bed reduction furnace 2*b*, and the gas discharged from the top of the fluidized bed reduction furnace 2*b* is then blown into the bottom of the fluidized bed reduction furnace 2*a*. In this way, fluidized bed reduction is carried out sequentially in the fluidized bed reduction furnaces 2*a* to 2*d*. That is, reducing gas flows sequentially through the fluidized bed reduction furnaces in the direction opposite to the reduction flow of the iron ore powder (from downstream to upstream).

Further, as illustrated in FIG. 1, gas blowing devices 9*a* to 9*d* are preferably disposed below the fluidized bed reduction furnaces and used to blow reducing gas into the fluidized bed reduction furnaces.

[Iron Ore Powder]

A raw material used in the processes of the present disclosure is iron ore powder. The particle size of the iron ore powder is not particularly limited, and iron ore powder of any particle size may be used. However, the larger the particle size, the harder fluidization becomes, and the flow rate of reducing gas must be increased, which decreases gas utilization rate and decreases productivity. Accordingly, maximum particle size of the iron ore powder is preferably 8 mm or less. On the other hand, a lower limit of the maximum particle size of the iron ore powder is also not particularly limited. Excessively fine particles are difficult to handle, and therefore the maximum particle size is preferably 0.25 mm or more. Iron grade is not particularly limited, and a wide range of low-grade and high-grade powder ore may be used.

[Fluidized Bed Reduction Furnace]

Any fluidized bed reduction furnace may be used as the fluidized bed reduction furnace without any particular limitation. Typically, the fluidized bed reduction furnace includes a charging inlet on one side of the furnace where iron ore powder is charged and an outlet on another side where iron ore powder is discharged. The first reducing gas is preferably blown in from the bottom of the fluidized bed reduction furnace. More specifically, the first reducing gas is preferably blown in through a dispersion plate from a gas blowing device disposed below the fluidized bed reduction furnace. After being used for fluidized bed reduction, gas is discharged from gas piping connected to the top of the furnace (furnace top). Further, the fluidized bed reduction furnace may include one or more cyclones for collecting powder ore at the top to prevent powder from scattering out of the furnace.

The number of fluidized bed reduction furnaces is not particularly limited and may be any number equal to or greater than one. However, in fluidized bed reduction, when reducing at high temperatures, iron ore powders agglomerate and stop flowing (start sticking), and to prevent this phenomenon, it is considered better to reduce at a relatively low temperature of about 500 °C and then raise the temperature in stages. Thus, in order to adjust the temperature in stages in the fluidized bed reduction furnace, use of a plurality of fluidized bed reduction furnaces is preferred. When a plurality of fluidized bed reduction furnaces is used, the number of the fluidized bed reduction furnaces is preferably 2 to 5.

When a plurality of fluidized bed reduction furnaces is used, the fluidized bed reduction process is preferably carried out sequentially in the fluidized bed reduction furnaces. In such a case, the top gas of the smelting reduction furnace is blown into the most downstream of the fluidized bed reduction furnaces. The top gas from a fluidized bed reduction furnace is then blown into the fluidized bed reduction furnace one stage upstream, and the fluidized bed reduction furnace top gas discharged from the top of the most upstream fluidized bed reduction furnace is used for methane synthesis and reforming. Further, the reduction temperature in each fluidized bed reduction furnace is preferably lowest in the first stage fluidized bed reduction furnace and higher in subsequent stages.

Flow rate of the reducing gas blown into the fluidized bed reduction furnace is preferably faster than the minimum fluidization velocity $U_{mf}$ and slower than the terminal velocity $U_t$, calculated from the particle size of the iron ore powder and physical properties of the reducing gas, in order to secure a stable flow condition.

[Smelting Reduction Furnace]

After being reduced in the fluidized bed reduction furnace, the partially reduced iron is charged into the smelting reduction furnace. In the smelting reduction furnace, the partially reduced iron is heated and melted, and is also smelted and reduced by the second reducing gas. The temperature of the heating and melting is not particularly limited. The temperature of the heating and melting is preferably 800 °C to 1500 °C.

In the smelting reduction process, in addition to the second reducing gas, biomass may be introduced into the smelting reduction furnace and used as a reducing agent. Further, the biomass may be simultaneously blown in with oxygen to generate reducing gas, and the heat of combustion generated may be used as a source of heating energy. Although $CO_2$ is generated at this time, when biomass is used, the $CO_2$ is considered to be absorbed by photosynthesis and is therefore practically carbon neutral.

Any smelting reduction furnace may be used as the smelting reduction furnace for the smelting reduction process without any particular limitation. A typical smelting reduction furnace includes an inner wall composed of a refractory material, but as described below, the refractory material wears out with the use of the smelting reduction furnace. Therefore, from the viewpoint of suppressing refractory material wear, a refractory material that has excellent corrosion resistance, specifically at least one refractory material selected from the group consisting of $Al_2O_3$—C, MgO—C, and MgO—Cr, is preferably used.

The partially reduced iron after reduction in the fluidized bed reduction furnace is high temperature and oxidizable, and is therefore easily re-oxidized during transport to the smelting reduction furnace in powder form. In powder form, charging into the smelting reduction furnace is difficult, and further, dropping is difficult due to aeration resistance increase in the furnace. Therefore, the partially reduced iron obtained in the fluidized bed reduction process is preferably subjected to the smelting reduction process after briquetting (briquetting process). The method of the briquetting is not particularly limited and may be any method. For example, the partially reduced iron obtained in the fluidized bed reduction process may be briquetted by hot compaction and hot forming in a briquetting device.

[Methane Synthesis]

According to the present disclosure, the fluidized bed reduction furnace top gas discharged from the top of the fluidized bed reduction furnace is divided into the first fluidized bed reduction furnace top gas and the second fluidized bed reduction furnace top gas, and methane is synthesized from the first fluidized bed reduction furnace top gas and hydrogen gas to obtain methane-containing gas.

In addition to the first fluidized bed reduction furnace top gas, other raw material gas may be used in the synthesis of methane. Any gas containing at least one of CO or $CO_2$ may be used as another raw material gas. A gas is preferably used that is a byproduct of the steelmaking process. More preferably, blast furnace gas (BFG), coke oven gas (COG), or BFG and COG is used.

On the other hand, hydrogen produced by any method may be used as the hydrogen. For example, hydrogen produced by electrolysis of water, or hydrogen produced by the decomposition reaction of ammonia, hydrocarbons, or organic hydrides may be used as the hydrogen. However, when hydrocarbons or organic hydrides are used as a raw material, $CO_2$ is emitted in the hydrogen synthesis process. Therefore, from the viewpoint of further reducing $CO_2$ emissions, use of hydrogen produced by at least one of the electrolysis of water or decomposition of ammonia is preferred. Further, when hydrogen is produced by electrolysis of water, green hydrogen produced using electrical power from green energy sources such as solar, wind, and geothermal power may be used to reduce $CO_2$ emissions to zero.

The reaction to produce methane from CO and $CO_2$ and $H_2$ is represented by Expressions (i) and (ii), as described earlier. The enthalpies of formation ΔH for both reactions are as follows.

$$CO_2 + 4H_2 \rightarrow CH_4 + 2H_2O \quad \Delta H = -165 \text{ kJ/mol} \tag{i}$$

$$CO + 3H_2 \rightarrow CH_4 + H_2O \quad \Delta H = -206 \text{ kJ/mol} \tag{ii}$$

As indicated by the negative enthalpies of formation, the reactions in Expressions (i) and (ii) are both exothermic and low temperatures are advantageous. Specifically, the reaction in Expression (i) indicates a $CO_2$ equilibrium conversion rate of about 95% at 300 °C. Further, the reaction of Expression (ii) indicates a CO equilibrium conversion rate of about 98% at 300 °C.

Commonly used methane conversion catalysts may be used for these reactions. Specifically, transition metal catalysts such as Fe, Ni, Co, and Ru may be used to reform $CO_2$ and CO to $CH_4$. Among these, Ni catalysts have high activity and heat resistance, and may be used at temperatures up to about 500 °C, and are therefore particularly preferred. Further, iron ore may be used as a catalyst, in particular high crystalline water ore has an increased specific surface area when the crystalline water is dehydrated, and is therefore suitable as a catalyst.

As a reactor, a fixed bed reactor, a fluidized bed reactor, an air flow bed reactor or the like may be used, and physical properties of the catalyst are selected according to the type of reactor. Further, a heat exchanger may be disposed in the gas flow path downstream of the reactor to recover heat from the reaction heat (gas sensible heat) of the methane conversion reaction in each reactor. The recovered thermal energy may be used to heat the smelting reduction furnace or the gas reformer.

When the gas introduced to the methane synthesizer contains dust, this may cause clogging or other problems. Therefore, the top gas from the fluidized bed reduction furnace is preferably dedusted by a dust remover before being introduced into the methane synthesizer, as described above.

Further, when $H_2O$ produced by methane synthesis is introduced into the gas reformer along with methane, the circulating gas is also introduced into the gas reformer, resulting in excess $H_2O$ in the gas reforming reaction. Considering the material balance of the entire circulation system, gas after methane synthesis is preferably dehydrated by a dehydrator, as described above.

[Gas Reforming]

The methane-containing gas synthesized in the methane synthesizer is supplied to the gas reformer together with the second fluidized bed reduction furnace top gas. The methane contained in the methane-containing gas is reformed to CO and $H_2$ in the gas reformer. The reforming reactions are represented by Expressions (iii) and (iv) below, as described above. The enthalpies of formation ΔH for both reactions are as follows.

$$CH_4+CO_2\rightarrow 2CO+2H_2\quad \Delta H=247\ \text{kJ/mol} \tag{iii}$$

$$CH_4+H_2O\rightarrow +3H_2\quad \Delta H=206\ \text{kJ/mol} \tag{iv}$$

As indicated by the positive enthalpies of formation, the reactions in Expressions (iii) and (iv) are both endothermic. Therefore, in the gas reforming described above, heating is performed so that the reforming reaction can proceed properly. Any energy source may be used as the energy source for the heating described above without particular limitation. Green energy such as solar, wind, and geothermal energy may in principle be used to reduce $CO_2$ emissions to zero.

According to an embodiment of the present disclosure, an amount $V_1$ of the first fluidized bed reduction furnace top gas supplied to the synthesis of methane and an amount Vw of water vapor in the second fluidized bed reduction furnace top gas supplied to the reforming of methane are adjusted according to variation in a $H_2$/CO ratio in the second reducing gas blown into the smelting reduction furnace. The following describes these adjustments.

As mentioned above, by circulating and reusing the fluidized bed reduction furnace top gas, $CO_2$ emissions can be extremely effectively decreased. However, the composition of the fluidized bed reduction furnace top gas varies for various reasons, including variation in the grade of the raw material iron oxide. As a result, the composition of the reformed gas obtained by methanation and reforming of the fluidized bed reduction furnace top gas also varies. Therefore, in order to improve mass balance and more stably implement the production of reduced iron in the closed system, the process is preferably adjusted according to the composition of the reformed gas (that is, the second reducing gas).

Therefore, according to an embodiment of the present disclosure, the amount $V_1$ of the first fluidized bed reduction furnace top gas supplied to the synthesis of methane and the amount Vw of water vapor in the second fluidized bed reduction furnace top gas supplied to the reforming of methane are adjusted according to variation in the $H_2$/CO ratio in the second reducing gas blown into the reduction furnace. The adjustments allow for more stable operations under a healthy mass balance.

As mentioned above, $H_2$ and CO in the second reducing gas blown into the smelting reduction furnace are synthesized by the reaction of $CH_4$ with $CO_2$ and $H_2O$ in the gas reformer 7, as represented by Expressions (iii) and (iv). Accordingly, the composition of the second reducing gas can be controlled by adjusting the amount Vw of water vapor in the second fluidized bed reduction furnace top gas supplied for methane reforming. Adjustment of the amount Vw of water vapor can be done by any method without any particular limitation. For example, condensation removal by cooling the second fluidized bed reduction furnace top gas can reduce the amount Vw of water vapor. Further, when increasing the amount Vw of water vapor, water vapor may be added to the second fluidized bed reduction furnace top gas.

On the other hand, the Expression (iv) indicates that when the amount Vw[$Nm^3$/t] of water vapor ($H_2O$) supplied to the gas reformer increases, the amount of $CH_4$ to react with $H_2O$ must also increase. $CH_4$ supplied to the gas reformer is synthesized by supplying a portion of the top gas discharged from the fluidized bed reduction furnace to the methane synthesizer, and therefore to increase the amount of $CH_4$ supplied to the gas reformer, the amount $V_1$[$Nm^3$/t] of the first fluidized bed reduction furnace top gas supplied to the methane synthesizer must be increased. That is, Vw and $V_1$ are positively related. Adjustment of the amount $V_1$ of the first fluidized bed reduction furnace top gas may be done by any method without any particular limitation. For example, the amount $V_1$ of the first fluidized bed reduction furnace top gas can be adjusted by changing a distribution ratio when the fluidized bed reduction furnace top gas discharged from the top of the fluidized bed furnace is divided into the first fluidized bed reduction furnace top gas and the second fluidized bed reduction furnace top gas. The units [$Nm^3$/t] of Vw and $V_1$ represent the amount of gas per tonne of reduced iron produced (volume in the normal state).

The $H_2$/CO ratio in the second reducing gas blown into the smelting reduction furnace may be measured by any method without any particular limitation. For example, the $H_2$/CO ratio may be obtained by collecting the second reducing gas prior to blowing into the reduction furnace and measuring the $H_2$ and CO concentrations of the second reducing gas. Various measurement methods, such as gas chromatography, may be used to measure $H_2$ and CO concentrations. The measurements are preferably performed continuously or intermittently.

The methods of adjusting $V_1$ and Vw are not particularly limited and control by any method is possible. From the viewpoint of maintaining a healthy mass balance, adjusting $V_1$ and Vw in the direction of suppressing fluctuations in the $H_2$/CO ratio is preferred.

Here, consider a state in which the $CO_2$ concentration in the fluidized bed reduction furnace top gas has decreased due to fluctuations in furnace temperature, for example. When operation continues in this state, the amount of $CO_2$ supplied to the methane synthesizer and gas reformer also decreases, and therefore among the reactions represented by Expressions (iii) and (iv), the reaction of Expression (iii) is suppressed and the reaction of Expression (iv) increases, relatively. As a result, the amount of $H_2$ in the reducing gas increases and the $H_2$/CO ratio in the reducing gas increases. Accordingly, the ratio of $H_2$ needs to be reduced to suppress the variation in the $H_2$/CO ratio of the reducing gas blown into the smelting reduction furnace. Therefore, in order to suppress the generation of CO and $H_2$ by the reaction represented by Expression (iv), it is preferable to decrease the amount Vw of water vapor supplied to the gas reformer and also decrease the amount $V_1$ of the first fluidized bed reduction furnace top gas according to the decrease in the amount Vw of water vapor.

Further, consider a state in which the $CO_2$ concentration in the top gas has increased due to variation in the grade of the iron ore powder used as raw material for the reduced iron, for example. When operation continues in this state, the amount of $CO_2$ supplied to the methane synthesizer and gas reformer also increases, and therefore among the reactions represented by Expressions (iii) and (iv), the reaction of Expression (iii) is promoted. As a result, the amount of CO in the reducing gas also increases, and the $H_2$/CO ratio in the reducing gas decreases. Accordingly, the ratio of $H_2$ needs to be increased to suppress the variation in the $H_2$/CO ratio in the reducing gas blown into the reduction furnace. Therefore, in order to promote the generation of CO and $H_2$ by the reaction represented by Expression (iv), it is preferable to increase the amount Vw of water vapor supplied to the gas reformer and also increase the amount $V_1$ of the first fluidized bed reduction furnace top gas according to the increase in the amount Vw of water vapor.

The amount of reducing gas supplied to the smelting reduction furnace varies when these operations are performed. When the range of the amount of reducing gas is too large, stable operation of the reduction furnace becomes difficult, and therefore attention to variation in the amount of reducing gas is also necessary. Specifically, when a decrease in amount of reducing gas is too large, this leads to a decrease in production volume and a decrease in product quality. On the other hand, when an increase in the amount of reducing gas is too large, gas ventilation resistance in the furnace increases and charged partially reduced iron does not fall. Accordingly, the flow rate of the second reducing gas supplied to the smelting reduction furnace is preferably 1500 $Nm^3/t$ or more. The flow rate of the second reducing gas supplied to the smelting reduction furnace is preferably 3500 $Nm^3/t$ or less.

When adjusting $V_1$ and Vw as described above, the ratio of $V_1$ to Vw is not particularly limited and can be adjusted arbitrarily. The relationship between $V_1$ and Vw varies from system to system, and therefore the relationship between $V_1$ and Vw is preferably determined in advance by simulation or the like, and adjustments are preferably made based on the relationship. The relationship between $V_1$ and Vw is not necessarily a linear relationship, and may be nonlinear. Therefore, when the relationship between $V_1$ and Vw is determined in advance by simulation or the like, the relationship between $V_1$ and Vw is preferably expressed as an arbitrary function such as a quadratic function, for example.

[Reduction Degree]

According to the present disclosure, long-term operational stability can be further improved by setting the reduction degree in the fluidized bed reduction process to 60% or more and 90% or less. The reason for this limitation is described below.

As mentioned above, in the process of reducing iron ore powder in a fluidized bed reduction furnace, a phenomenon (sticking) is known that causes iron ore powder to agglomerate in the furnace or adhere and solidify to an inner wall of the reaction vessel, which not only impedes the progress of reduction but also makes discharge from the fluidized bed reduction furnace difficult.

This sticking is a phenomenon in which iron ore powder agglomerates due to the formation of fibrous iron, which becomes entangled. The formation of fibrous iron is a phenomenon in which the diffusion rate of $Fe^{2+}$ is sufficiently faster than the reduction rate of FeO in the stage of reduction from FeO to metallic iron, and $Fe^{2+}$ diffuses in a specific direction with defects and the like as initiation points, and iron nuclei grow.

The inventors found that when the reduction degree in the fluidized bed reduction process is higher than 90%, the generation of fibrous iron becomes more obvious. Accordingly, from the viewpoint of suppressing sticking, the reduction degree in the fluidized bed reduction process is preferably 90% or less. The reduction degree in the fluidized bed reduction process is more preferably 80% or less.

Further, refractory materials such as refractory bricks are typically used in smelting reduction furnaces, but it is known that high temperatures and long periods of smelting reduction wear out the refractory materials, shortening service life. That is, during smelting reduction, C in refractory bricks is oxidized by oxidizing components such as $CO_2$ and $H_2O$ in gas, promoting erosion of the refractory material. Further, slag adheres to the refractory surface when the furnace is in use, providing protection for the refractory, but the high percentage of iron oxide in the slag reduces the viscosity of the slag, which decreases the protective effect of the adhered slag.

The inventors have found that when the reduction degree in the fluidized bed reduction process is less than 60%, then in addition to a higher percentage of iron oxide, the time required for smelting reduction becomes longer, resulting in obvious wear of the refractory material in the smelting reduction furnace. Therefore, from the viewpoint of suppressing wear in the refractory material of the smelting reduction furnace, the reduction degree in the fluidized bed reduction process is preferably 60% or more. The reduction degree in the fluidized bed reduction process is more preferably 70% or more.

By controlling the reduction degree in the fluidized bed reduction process as described above, sticking in the fluidized bed reduction furnace and wear of refractory material in the smelting reduction furnace can be suppressed and long-term operational stability can be further improved.

The reduction degree in the fluidized bed reduction process is defined here as the value calculated from the oxygen content $[O]_0$ (wt %) in the iron ore powder as raw material and the oxygen content $[O]_1$ (wt %) in the partially reduced iron according to the following Expression (1).

$$\text{Reduction degree (\%)} = ([O]_0 - [O]_1)/[O]_0 \times 100 \tag{1}$$

The oxygen content in the iron ore powder as raw material can be determined by the following procedure. First, the total iron (T.Fe) content and FeO content in the iron ore powder are determined by chemical analysis. From the FeO content value obtained, the amount of Fe contained as FeO in the iron ore powder is calculated. The Fe content contained as FeO is then subtracted from the T.Fe content to obtain the Fe content contained as $Fe_2O_3$. The $Fe_2O_3$ content is then calculated from the value of the Fe content contained as $Fe_2O_3$. Then, from each of the FeO content and the $Fe_2O_3$ content, the O content contained as FeO and the O content contained as $Fe_2O_3$ can be calculated and added together to obtain the oxygen content in the iron ore powder.

The oxygen content in the partially reduced iron is determined by the following procedure. First, the total iron (T.Fe) content, FeO content, and metallic iron (M.Fe) content in the partially reduced iron are determined by chemical analysis. From the FeO content value obtained, the amount of Fe contained as FeO in the partially reduced iron is calculated. The Fe content contained as $Fe_3O_4$ is then determined by subtracting the Fe content contained as FeO and the M.Fe content from the T.Fe content. The $Fe_3O_4$ content is then calculated from the Fe content contained as $Fe_3O_4$. From each of the FeO content and the $Fe_3O_4$ content, the O content contained as FeO and the O content contained as $Fe_3O_4$ can be calculated and added together to obtain the oxygen content in the partially reduced iron.

Figure 2:
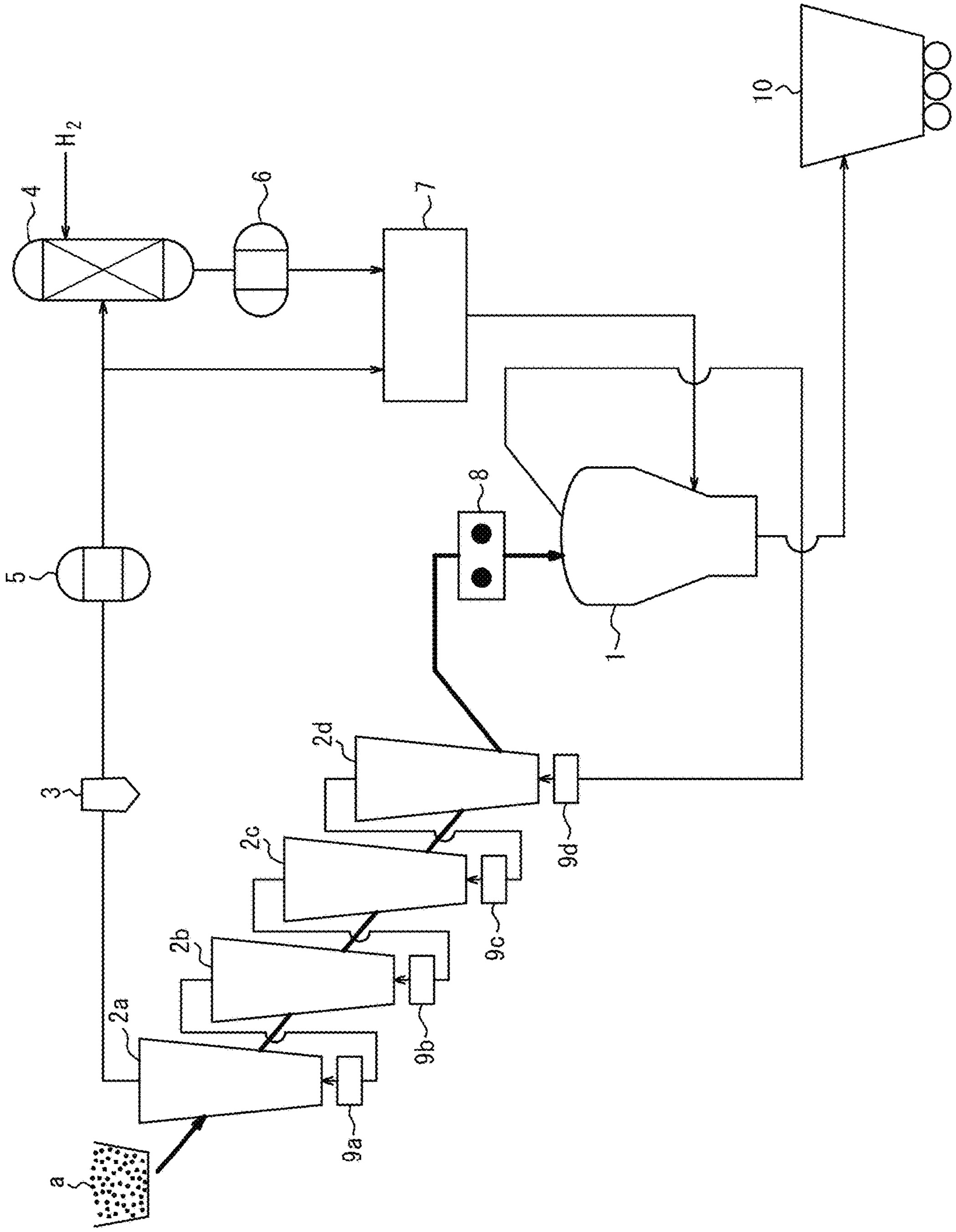
FIG. 2 is a schematic diagram of the method of reducing iron ore powder according to another embodiment of the present disclosure.

According to the embodiment illustrated in FIG. 1 and described above, the dehydrator 5 is disposed before the gas reformer 7 to dehydrate the second fluidized bed reduction furnace top gas prior to reforming. However, $H_2O$ is produced in the methane synthesis reaction as indicated in Expressions (i) and (ii), and therefore the conversion rate decreases when the introduced gas contains $H_2O$. Accordingly, the fluidized bed reduction furnace top gas is preferably dehydrated by a dehydrator before being introduced into the methane synthesizer. Specifically, as illustrated in FIG. 2, the dehydrator 5 is preferably disposed upstream of the position where the fluidized reducing furnace top gas is divided into the first fluidized bed reduction furnace top gas and the second fluidized reducing furnace top gas, and the fluidized bed reduction furnace top gas is dehydrated prior to the division into the first fluidized bed reduction furnace top gas and the second fluidized reducing furnace top gas. The dehydrator 5 may be disposed at both the positions illustrated in FIG. 1 and FIG. 2 to perform dehydrating.

EXAMPLES

Examples of the present disclosure are described below. The Examples are intended to be illustrative, and do not limit the present disclosure to the Examples.

Example 1

Iron ore powder having a particle size of 1 mm or less was used as raw material, and reduction tests were conducted by the process illustrated in FIG. 1. The production rate of reduced iron was set at 15 kg/h. The temperatures in the fluidized bed reduction furnaces 2*a* to 2*d* were set at 450 °C, 650 °C, 750 °C, and 850 °C, respectively. The temperature of the smelting reduction furnace 1 was set at 1500 °C. The supply pressure of the second reducing gas to the smelting reduction furnace was set at 3 atm, and the flow rate of the first reducing gas blown into the fluidized bed reduction furnaces was set at 1.0 m/s to secure a stable flow condition. By using the process of circulating and reusing the top gas from the fluidized bed reduction furnaces, $CO_2$ emissions from the process were reduced to zero.

Example 2

Next, reduction tests of iron ore powder were conducted at different degrees of reduction to evaluate the effect of the reduction degree in the fluidized bed reduction process. The reduction degree in the fluidized bed reduction process was adjusted by varying the reduction time in the fluidized bed reduction furnaces. The tests were conducted for 7 days to 14 days until steady state conditions were reached, and the partially reduced iron was sampled immediately after exiting the fluidized bed reduction furnaces to determine the reduction degree. The method used to calculate the reduction degree was as described earlier. Other test conditions were the same as in Example 1 above.

<Sticking>

When sticking occurs during the reduction process in the fluidized bed reduction furnace, the amount of fluidized powder is decreased, and therefore the pressure differential between the top and bottom of the fluidized bed reduction furnace decreases. Therefore, sticking occurrence in the fluidized bed reduction furnace was evaluated furnace based on the maximum value of $\Delta P/\Delta t$, the rate of decrease of the pressure difference during the test. The evaluation criteria were as follows.

1: $\Delta P/\Delta t$: less than 5 kPa/min
2: $\Delta P/\Delta t$: 5 kPa/min or more and 10 kPa/min or less
3: $\Delta P/\Delta t$: more than 10 kPa/min <Refractory Material Wear>

After the testing, the wear of the refractory material of the smelting reduction furnace was evaluated visually. The evaluation criteria were as follows.

1: No discoloration on surface immersed in molten material
2: Slight discoloration on surface immersed in molten material compared to surface not immersed
3: Obvious discoloration on surface immersed in molten material compared to surface not immersed The measured reduction degree and the results of the evaluation of sticking and refractory material wear are listed in Table 1. As can be seen from the results, refractory material wear was suppressed when the reduction degree in the fluidized bed reduction process was 60% or more. Further, sticking was suppressed when the reduction degree in the fluidized bed reduction process was 90% or less.

TABLE 1

| No. | Reduction gedree in fluidized bed reduction furnace (%) | Sticking | Refractory material wear |
|---|---|---|---|
| 1 | 8 | 1 | 3 |
| 2 | 12 | 1 | 3 |
| 3 | 21 | 1 | 3 |
| 4 | 25 | 1 | 3 |
| 5 | 32 | 1 | 3 |
| 6 | 43 | 1 | 3 |
| 7 | 50 | 1 | 3 |
| 8 | 56 | 1 | 3 |
| 9 | 60 | 1 | 2 |
| 10 | 61 | 1 | 2 |
| 11 | 69 | 1 | 2 |
| 12 | 72 | 1 | 1 |
| 13 | 75 | 1 | 1 |
| 14 | 81 | 2 | 1 |
| 15 | 87 | 2 | 1 |
| 16 | 92 | 3 | 1 |
| 17 | 95 | 3 | 1 |
| 18 | 100 | 3 | 1 |

REFERENCE SIGNS LIST

1: smelting reduction furnace
2*a* to 2*d*: fluidized bed reduction furnaces
3: dust remover
4: methane synthesizer
5: dehydrator
6: dehydrator
7: gas reformer
8: briquetting-device
9*a* to 9*d*: gas blowing device
10: electric furnace
a: iron ore powder

The invention claimed is:

1. A method of reducing iron ore powder, the method comprising:

a fluidized bed reduction process of fluidizing and reducing iron ore powder in a fluidized bed reduction furnace using a first reducing gas to produce partially reduced iron; and a smelting reduction process of reducing the partially reduced iron in a smelting reduction furnace using a second reducing gas, wherein fluidized bed reduction furnace top gas discharged from the top of the fluidized bed reduction furnace is divided into a first fluidized bed reduction furnace top gas and a second fluidized bed reduction furnace top gas, methane is synthesized from the first fluidized bed reduction furnace top gas and hydrogen gas to obtain methane-containing gas, the methane-containing gas is reacted with the second fluidized bed reduction furnace top gas to reform methane contained in the methane-containing gas to obtain reformed gas, in the smelting reduction process, the reformed gas is blown into the smelting reduction furnace as the second reducing gas, and in the fluidized bed reduction process, smelting reduction furnace top gas discharged from the top of the smelting reduction furnace is blown into the fluidized bed reduction furnace as the first reducing gas.

2. The method of reducing iron ore powder according to claim 1, wherein an amount $V_1$ of the first fluidized bed reduction furnace top gas supplied to the synthesis of methane and an amount Vw of water vapor in the second fluidized bed reduction furnace top gas supplied to the reforming of methane are adjusted according to variation in a $H_2/CO$ ratio in the second reducing gas blown into the smelting reduction furnace.

3. The method of reducing iron ore powder according to claim 2, wherein when the $H_2/CO$ ratio increases, the amount Vw of water vapor and the amount $V_1$ of the first fluidized bed reduction furnace top gas are decreased.

4. The method of reducing iron ore powder according to claim 2, wherein when the $H_2/CO$ ratio decreases, the amount Vw of water vapor and the amount $V_1$ of the first fluidized bed reduction furnace top gas are increased.

5. The method of reducing iron ore powder according to claim 1, wherein the reduction degree in the fluidized bed reduction process is 60% or more and 90% or less.

6. The method of reducing iron ore powder according to claim 5, wherein the reduction degree in the fluidized bed reduction process is 70% or more and 80% or less.

7. The method of reducing iron ore powder according to claim 1, wherein the fluidized bed reduction furnace top gas is dedusted prior to the division into the first fluidized bed reduction furnace top gas and the second fluidized bed reduction furnace top gas.

8. The method of reducing iron ore powder according to claim 1, wherein the second fluidized bed reduction furnace top gas is dehydrated prior to the reforming.

9. The method of reducing iron ore powder according to claim 1, wherein the fluidized bed reduction furnace top gas is dehydrated prior to the division into the first fluidized bed reduction furnace top gas and the second fluidized bed reduction furnace top gas.

10. The method of reducing iron ore powder according to claim 1, wherein the methane-containing gas is dehydrated prior to the reforming.

11. The method of reducing iron ore powder according to claim 1, further comprising a briquetting process of briquetting the partially reduced iron prior to the smelting reduction process.

12. The method of reducing iron ore powder according to claim 3, wherein when the $H_2/CO$ ratio decreases, the amount Vw of water vapor and the amount $V_1$ of the first fluidized bed reduction furnace top gas are increased.

13. The method of reducing iron ore powder according to claim 2, wherein the reduction degree in the fluidized bed reduction process is 60% or more and 90% or less.

14. The method of reducing iron ore powder according to claim 13, wherein the reduction degree in the fluidized bed reduction process is 70% or more and 80% or less.

15. The method of reducing iron ore powder according to claim 2, wherein the fluidized bed reduction furnace top gas is dedusted prior to the division into the first fluidized bed reduction furnace top gas and the second fluidized bed reduction furnace top gas.

16. The method of reducing iron ore powder according to claim 2, wherein the second fluidized bed reduction furnace top gas is dehydrated prior to the reforming.

17. The method of reducing iron ore powder according to claim 2, wherein the fluidized bed reduction furnace top gas is dehydrated prior to the division into the first fluidized bed reduction furnace top gas and the second fluidized bed reduction furnace top gas.

18. The method of reducing iron ore powder according to claim 2, wherein the methane-containing gas is dehydrated prior to the reforming.

19. The method of reducing iron ore powder according to claim 2, further comprising a briquetting process of briquetting the partially reduced iron prior to the smelting reduction process.

* * * * *